(12) United States Patent
Minamino

(10) Patent No.: US 7,889,917 B2
(45) Date of Patent: Feb. 15, 2011

(54) DEVICE AND METHOD FOR IMAGE COLOR DETERMINATION

(75) Inventor: Katsushi Minamino, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 833 days.

(21) Appl. No.: 11/849,863

(22) Filed: Sep. 4, 2007

(65) Prior Publication Data

US 2008/0056565 A1    Mar. 6, 2008

(30) Foreign Application Priority Data

Sep. 6, 2006    (JP) .............................. 2006-242192

(51) Int. Cl.
*G06K 9/00*    (2006.01)
(52) U.S. Cl. .................. 382/162; 382/165; 358/520
(58) Field of Classification Search .............. 382/162, 382/165, 252, 167; 358/1.14, 500, 518–521
See application file for complete search history.

(56) References Cited

U.S. PATENT DOCUMENTS

| 5,786,906 | A * | 7/1998 | Shishizuka | 358/500 |
| 2006/0087673 | A1 * | 4/2006 | Kawaguchi | 358/1.14 |
| 2006/0193513 | A1 * | 8/2006 | Minamino | 382/165 |

FOREIGN PATENT DOCUMENTS

| JP | 02026183 A | 1/1990 |
| JP | 09-051443 | 2/1997 |
| JP | 09051443 A | 2/1997 |
| JP | 09-149276 | 6/1997 |
| JP | 2001045297 A | 2/2001 |
| JP | 2004153586 A | 5/2004 |
| JP | 2005269444 A | 9/2005 |
| JP | 2005347963 A | 12/2005 |
| JP | 2005354188 A | 12/2005 |
| JP | 2006042194 A | 2/2006 |

OTHER PUBLICATIONS

Chinese language office action and its English language translation for corresponding Chinese application 200710149523.2.
Japanese language office action and its English language translation for corresponding Japanese application 2006242192.

* cited by examiner

*Primary Examiner*—Duy M Dang
(74) *Attorney, Agent, or Firm*—DLA Piper LLP (US)

(57) ABSTRACT

An image color determining device. A ground color presence detecting section determines the presence of a ground color of a target image based on image data relating to the target image. A ground color region specifying section specifies a ground color region in a color space when it is determined that the ground color is present. The ground color region determining section determines whether or not the image data to be determined is a ground color region based on the specified ground color region. The ground color replacing section replaces the image data determined as the ground color region with a predetermined color.

17 Claims, 11 Drawing Sheets

&& # DEVICE AND METHOD FOR IMAGE COLOR DETERMINATION

CROSS-REFERENCE TO RELATED APPLICATIONS

This application claims priority under 35 U.S.C. 119 to Japanese Patent Application No. 2006-242192, filed on Sep. 6, 2006, which application is hereby incorporated by reference in its entirety.

BACKGROUND OF THE INVENTION

1. Field of the Invention

The present invention relates to an image color determining device and method for determining a ground color of a target image and, in particular, relates to an improvement in removing or replacing the ground color with a predetermined color.

2. Description of the Related Art

An image processing device that executes a predetermined process based on the ground color or the background color of a document is known. Such an image processing device reads the front end part of the document with a reading unit, determines the color of the ground color of the document, replaces the portion other than the ground color of the document with a light color when the color of the ground color is dark, and replaces the portion other than the ground color with a dark color when the color of the ground color is light, so that a readable color document can be recorded or transmitted.

The image processing device described above replaces the portion other than the ground color of the document with a light color or a dark color. However, an image processing device that replaces the ground color portion of the document with a predetermined color is not known.

SUMMARY OF THE INVENTION

The present invention provides an image color determining device and method for replacing the ground color of a target image with a predetermined color through a simple process.

In order to overcome the problems described above, embodiments of the present invention relate to an image color determining device including a ground color presence detecting section, a ground color region specifying section, a ground color region determining section, and a ground color replacing section. The ground color presence detecting section determines a presence of ground color of a target image based on image data relating to the target image. The ground color region specifying section specifies a ground color region in a color space when it is determined that the ground color is present by the ground color presence detecting section. The ground color region determining section determines whether or not the image data to be determined is a ground color region based on the ground color region specified by the ground color region specifying section. The ground color replacing section replaces the image data determined as the ground color region by the ground color region determining section with a predetermined color.

In one embodiment, the device includes a first pre-determination processing section for performing a first pre-determination process for ground color determination on the image data relating to the target image; a second pre-determination processing section for performing a pre-process for image output on the image data relating to the target image, the pre-process being a second pre-determination process different from the first pre-determination process; and a correction processing section for performing a correction process corresponding to inverse transformation of the second pre-determination process and a correction process corresponding to the first pre-determination process on the image performed with the second pre-determination process. In one embodiment, the image data performed with the first pre-determination process is a processing target of the ground color presence detecting section and the ground color region specifying section; and the ground color region determining section determines whether the ground color region or not based on the ground color region specified by the ground color region specifying section and the image data performed with the correction process by the correction processing section. Since the pre-determinations can be separately performed for the process related to ground color and for the image output, an optimal pre-determination process can be performed for the individual purposes. That is, the ground color presence detection, ground color region specification, and ground color region determination can be accurately performed by performing the first pre-determination process optimal for the process related to ground color independently from the second pre-determination process for the image output. Furthermore, the shift in positions in the color space of the image data to be determined and the ground color region specified by the ground color region specifying section, which occurs due to the difference in the first pre-determination process and the second pre-determination process, can be absorbed by the correction process of the correction processing section. Therefore, an accurate ground color region determination can be performed.

One embodiment of the present invention includes a first pre-determination processing section for performing a first pre-determination process for the ground color determination on the image data relating to the target image; a second pre-determination processing section for performing a pre-process for the image output on the image data relating to the target image, the pre-process being a second pre-determination process different from the first pre-determination process; and a correction processing section for performing a correction process corresponding to inverse transformation of the first pre-determination process and a correction process corresponding to the second pre-determination process on the ground color region specified by the ground color region specifying section. In one embodiment, the ground color region determining section determines whether the ground color region or not based on the ground color region corrected by the correction processing section and the image data performed with the second pre-determination process. Since the pre-determinations can be separately performed for the process relating to the ground color and for the image output, an optimal pre-determination process can be performed for the individual purposes. That is, the ground color presence detection, ground color region specification, and ground color region determination can be accurately performed by performing the first pre-determination process optimal for the process related to the ground color independently from the second pre-determination process for the image output. Furthermore, the shift in positions in the color space of the image data to be determined and the ground color region specified by the ground color region specifying section, which occurs due to the difference in the first pre-determination process and the second pre-determination process, can be absorbed by the correction process of the correction processing section. Therefore, an accurate ground color region determination can be performed.

In one embodiment, the ground color presence detecting section counts the number of constituting units of the image data for every color region on a two-dimensional color plane divided into a plurality of color regions, and determines the presence of ground color using the counted result; and the ground color region specifying section specifies the ground color region based on three-dimensional distribution of the constituting units in the color region corresponding to the ground color in the color space when it is determined that the ground color is present by the ground color presence detecting section. Since the ground color region is specified based on the distribution of the actual constituting units instead of having the entire color region corresponding to the ground color region as the ground color region, the ground color region of the ground color contained in the actual target image is accurately specified. Furthermore, the configuration for counting is simplified, since the counting for the detection of the presence of the ground color is performed for every color region on the two-dimensional color plane. That is, after the presence of ground color is detected with a simple configuration, the accurate ground color region in the color space can be specified based on the three-dimensional distribution of the image data of the actual ground color.

In one embodiment, the ground color region specifying section calculates a maximum value and a minimum value of a plurality of constituting units counted for the color region corresponding to the ground color in the color space, and determines the ground color region based on the maximum value and the minimum value. The ground color region thus can be more accurately determined In one embodiment, the ground color presence detecting section averages pixel data for every pixel set containing a plurality of pixels, and performs color determination of the pixel data with the averaged pixel data as the constituting unit. The influence of false color is thereby eliminated.

An image color determining method according to the present invention includes a ground color presence detecting step, a ground color region specifying step, a ground color region determining step, and a ground color replacing step. In the ground color presence detecting step, the presence of ground color of a target image is determined based on image data relating to the target image. In the ground color region specifying step, a ground color region in a color space is specified when it is determined that the ground color is present in the ground color presence detecting step. In the ground color region determining step, whether or not the image data to be determined is a ground color region is determined based on the ground color region specified in the ground color region specifying step. In the ground color replacing step, the image data determined as the ground color region in the ground color region determining step is replaced with a predetermined color.

According to the present invention, only the color belonging to the ground color region in the target image can be replaced with a processing color other than white, or can be replaced with white and remove the ground color with a simple process.

Other features, elements, processes, steps, characteristics and advantages of the present invention will become more apparent from the following detailed description of embodiments of the present invention with reference to the attached drawings.

DETAILED DESCRIPTION OF EMBODIMENTS OF THE INVENTION

Embodiments of the present invention will now be described in detail with reference to the drawings.

<1. Configuration of Image Color Determining Device>

Figure 1:
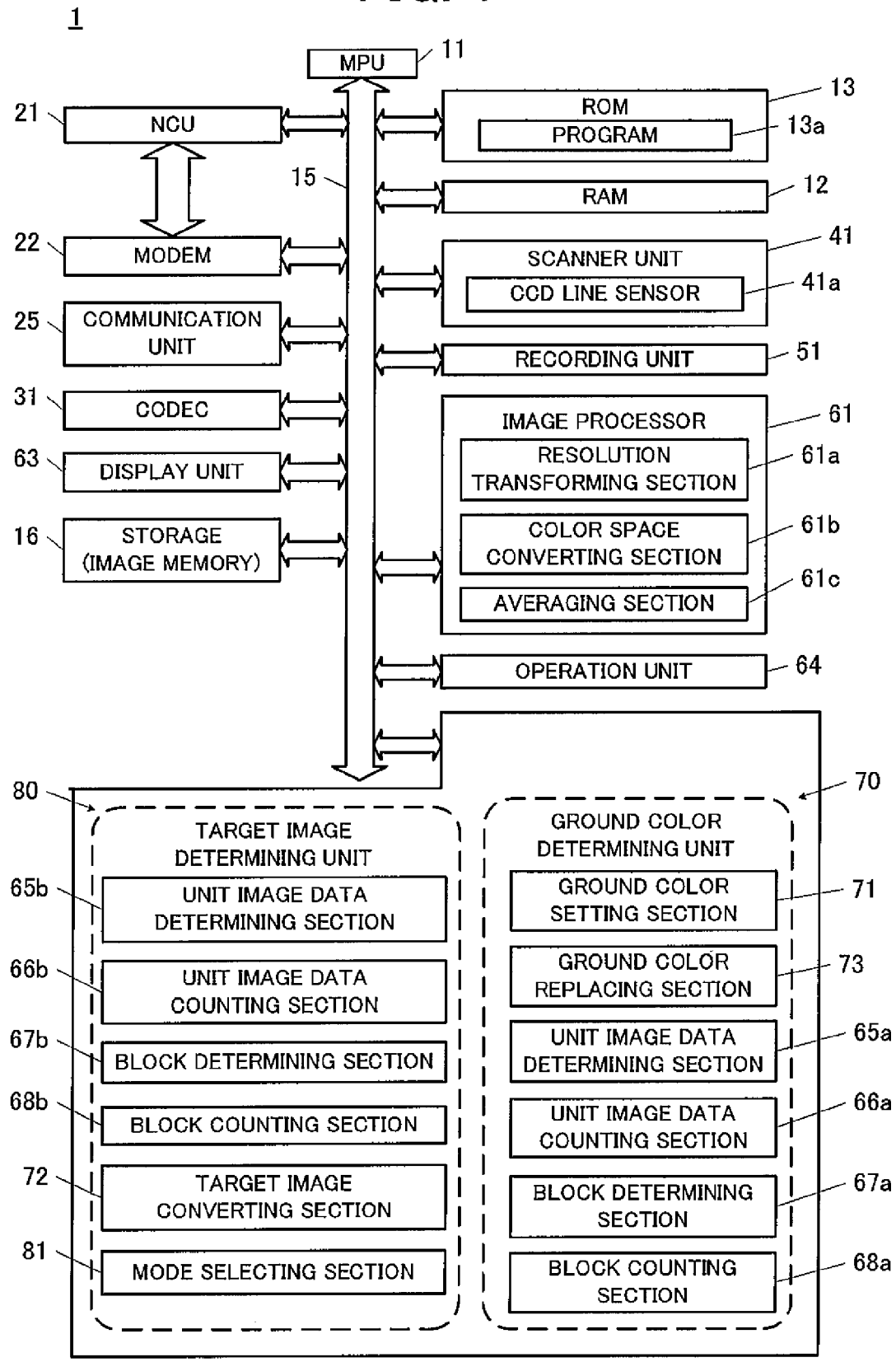
FIG. 1 is a block diagram of an image color determining device according to an embodiment of the present invention.

FIG. 1 is a block diagram of an image color determining device 1 according to an embodiment of the invention. The image color determining device 1 is a scanner, a printer, a copying machine, a facsimile, or a multifunction peripheral in which these functions are combined. The image color determining device 1 also detects a ground color of a document read by a scanner unit 41. "Ground color" herein refers to a background color of a document.

As shown in FIG. 1, the image color determining device 1 mainly includes the scanner unit 41, a recording unit 51, a ground color determining unit 70, and a target image determining unit 80.

A modem 22 converts digital data to an audio signal for transmission or converts an audio signal received by the image color determining device 1 to digital data. An NCU (Network Control Unit) 21 connects the image color determining device 1 to a public switched telephone network. The NCU 21 sends or receives a call or performs dial control. A communication unit 25 is a LAN (Local Area Network) interface for performing data communication with an information processing device (not illustrated) and the like connected via a network.

A CODEC 31 is used in reversible compression processing of an image transmitted in facsimile communication. The CODEC 31 encodes an image read from a document by the scanner unit 41 and binarized in an image processor 61. The encoded image is stored in an image memory 16. The CODEC 31 decodes facsimile data (binary data) transmitted from another image color determining device. The decoded binary data is provided to the recording unit 51 and performed with a recording process.

CODEC 31 may use the methods of MH (Modified Huffman), MR (Modified Read), MMR (Modified MR), and JBIG (Joint Bi-level Image experts Group) when encoding the binary data. The CODEC 31 also encodes multivalue data. Multivalue data is encoded by, for example, a JPEG method.

The scanner unit 41 reads an image from a document. The image data (camera image data) read by the scanner unit 41 is compressed through the JPEG method by the CODEC 31 and stored in the image memory 16.

That is, the scanner unit 41 reads an image drawn on a document by a CCD line sensor 41a to be described later, and generates image data relating to the image. The scanner unit 41 may read an image drawn on a document through an ADF (Automatic Document Feeder) method or an FBS (Flat Bed Scanner) method. The ADF method feeds the document one page at a time from a document stack and reads the document, whereas the FBS method reads the document placed on a contact glass. The ADF method may read a moving document with a stationary reading optical system (sheet through method), or may read a stationary document with a moving reading optical system. Under the latter method, the scanner unit 41 repeatedly rests the document on the contact glass, reads the stationary document with the moving reading optical system, and discharges the read document.

The CCD line sensor 41a repeats reading at constant intervals when the reading optical system that guides the light from the document to the CCD line sensor 41a is scanning the document, so that image data represented in the RGB color space, that is, image data having color component data of R (red), G (green), and B (blue), is generated. The scanning speed of the reading optical system is set based on the resolution in the sub-scanning direction of the image data generated by the CCD line sensor 41a. Specifically, the higher the resolution in the sub-scanning direction is, the slower the scanning speed of the reading optical system is, and the lower the resolution in the sub-scanning direction is, the faster the scanning speed of the reading optical system is. The "scanning speed" is the relative movement speed of the document and the reading optical system.

The recording unit 51 is an image forming unit that records a toner image based on an electrostatic latent image on recording paper through the electrophotographic method. For instance, the recording unit 51 forms the toner image based on read image data on a photoconductive drum (not illustrated), and transfers the toner image on the recording paper. Thus, the recording unit 51 performs recording processing on the image to be recorded.

The image processor 61 performs a predetermined image process on the image. The image processor 61 performs processes of gamma correction on the image, of transforming the resolution of the image, of converting the color space of the image from a first color space to a second color space (e.g., from RGB color space to Lab (Luminance L, chromaticity a, b) color space), and the like. The image processing may be realized in software by an MPU 11 based on a program 13a stored in a ROM 13.

A display unit 63 may be configured by a so-called liquid crystal display and a touch panel where positions on the screen can be specified by touching the screen with a finger or a dedicated pen. The user gives an instruction using the touch panel based on the content displayed on the display unit 63 to execute a predetermined operation on the image color determining device 1. The display unit 63 thus is also used as an input unit.

An operation unit 64 is an input unit that may be configured by a so-called key pad. The user performs an input operation based on the displayed content on the display unit 63 to execute a predetermined operation on the image color determining device 1.

The ground color determining unit 70 determines the ground color of the target image based on image data obtained by reading a document with the scanner unit 41 and the image data stored in the image memory 16 (hereinafter also referred to as "image data relating to target image"). The target image determining unit 80 uses the determination result of the ground color determining unit 70 to execute the color determination of the target image based on the image data relating to the target image. The target image determining unit 80 also uses the determination result of the ground color determining unit 70 to execute the color determination of the target image on a color plane H, and selects a processing mode executed in the recording unit 51 and a processing unit such as the image processor 61 based on the color determination result. For example, the target image determining unit 80 can select a color mode enabling the execution of color processing and a monochrome mode enabling the execution of monochrome processing.

The detailed configuration of the ground color determining unit 70 and the target image determining unit 80 will be described later.

The ground color determining unit 70 counts the number of constituting units of the image data (unit image data) for every color region on a two-dimensional plane, and determines the presence of a ground color using the counted result. That is, the ground color determining unit 70 counts the constituting units for every color region formed on the two-dimensional color plane, and determines the presence of the ground color depending on whether or not the distribution of the constituting unit is biased to a specific color region. When the distribution is biased to a specific color region, the ground color of the color corresponding to the color region is determined to exist. When the distribution is not biased to a specific color region, that is, when the distribution is dispersed to the same extent with respect to a plurality of color regions, the ground color is determined as not existing. The ground color is also determined as not existing when the distribution is biased to an achromatic region.

The target image determining unit 80 counts the number of constituting units of the image data (unit image data) for every color region on the two-dimensional plane, and performs color determination using the counted result. That is, the target image determining unit 80 counts the constituting units for every color region formed on the two-dimensional plane, and performs color determination of the target image using the counted result. Assuming that the color region is an achromatic region (region near the origin) and a chromatic region (region excluding the achromatic region), determination is made on whether the target image is a color image or a monochrome image based on the distribution of the constituting units in the achromatic region and the chromatic region. For instance, the target image can be determined as a monochrome image when the number of constituting units existing in the achromatic region is large and the number of constituting units existing in the chromatic region is small, whereas the target image can be determined as a color image when the number of constituting units existing in the chromatic region is large.

Thus, although the ground color determining unit 70 and the target image determining unit 80 execute different processes, the counting by the ground color determining unit 70 and the counting by the target image determining unit 80 are executed using a common circuit in the present embodiment, focusing on the fact that both the units have in common the process of performing the counting process for every color region. The configuration of the image color determining device 1 is thus simplified.

A RAM (Random Access Memory) 12 and the image memory 16 are readable and writable volatile memories (storage). A ROM (Read Only Memory) 13 is a read-only memory. An MPU (Micro Processing Unit) 11 performs control according to the program 13a stored in the ROM 13. The MPU 11, the ROM 13, the recording unit 51, and the like are electrically connected by way of a signal line 15. Therefore, the MPU 11 can control the recording unit 51 to execute the recording processing and the like at a predetermined timing.

<2. Configuration of Ground Color Determining Unit and Target Image Determining Unit>

The configuration of the ground color determining unit 70 and the target image determining unit 80 will now be described. As shown in FIG. 1, the ground color determining unit 70 mainly includes a unit image data determining section 65a, a unit image data counting section 66a, a block determining section 67a, a block counting section 68a, a ground color setting section 71, and a ground color replacing section 73.

As shown in FIG. 1, the target image determining unit 80 mainly includes a unit image data determining section 65b, a unit image data counting section 66b, a block determining section 67b, a block counting section 68b, a target image converting section 72, and a mode selecting section 81.

The unit image data determining section 65b, the unit image data counting section 66b, the block determining section 67b, and the block counting section 68b of the target image determining unit 80 have a hardware configuration similar to that of the corresponding unit image data determining section 65a, the unit image data counting section 66a, the block determining section 67a, and the block counting section 68a of the ground color determining unit 70.

The unit image data determining section 65 (65a, 65b), the unit image data counting section 66 (66a, 66b), the block determining section 67 (67a, 67b), and the block counting section 68 (68a, 68b) in the present embodiment respectively execute the counting process and the determination process based not on the pixels constituting the target image, but on the unit image data (constituting unit) acquired based on the target image.

The unit image data is a pixel group obtained by dividing the target image by every adjacent n (n is a natural number) pixels, where the average value of the values of the pixels in the corresponding pixel group is used for the value of each unit image data.

For example, each unit image data may be constituted by a pixel group that is two pixels long (sub-scanning direction) and two pixels wide (main scanning direction) (i.e., n="4"). When the color space of the target image is RGB, the average R value, G value, and B value of the four pixels in the pixel group is used for the value (R, G, B) of each unit image data. Therefore, the process of generating the unit image data is realized in the present embodiment as an averaging process of averaging a predetermined number of adjacent pixel data.

Furthermore, in the present embodiment, the processes performed by the unit image data determining section 65, the unit image data counting section 66, the block determining section 67, and the block counting section 68 are performed on the image data affine-transformed on the two-dimensional color plane H.

The color plane H will be described first, and the unit image data determining section 65, the unit image data counting section 66, the block determining section 67, the block counting section 68, the ground color setting section 71, the ground color replacing section 73, the target image converting section 72, and the mode selecting section 81, which are the components of the ground color determining unit 70 and the target image determining unit 80, will be described thereafter.

<2.1 Configuration of Color Plane>

Figure 2:
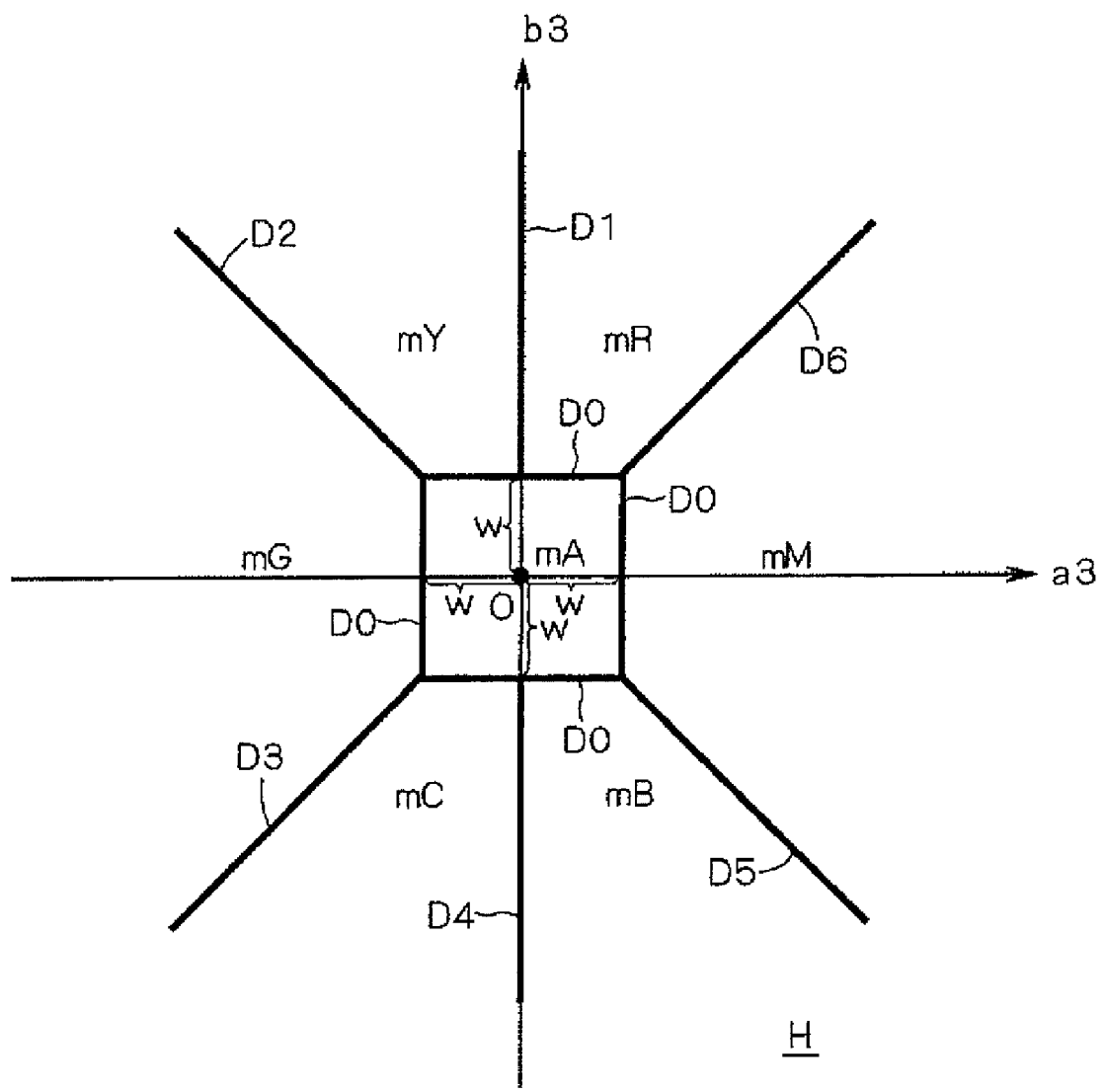
FIG. 2 is an example of a color plane used in processes performed by a unit image data determining section, a unit image data counting section, a block determining section, and a block counting section according to an embodiment of the invention.
Figure 3:
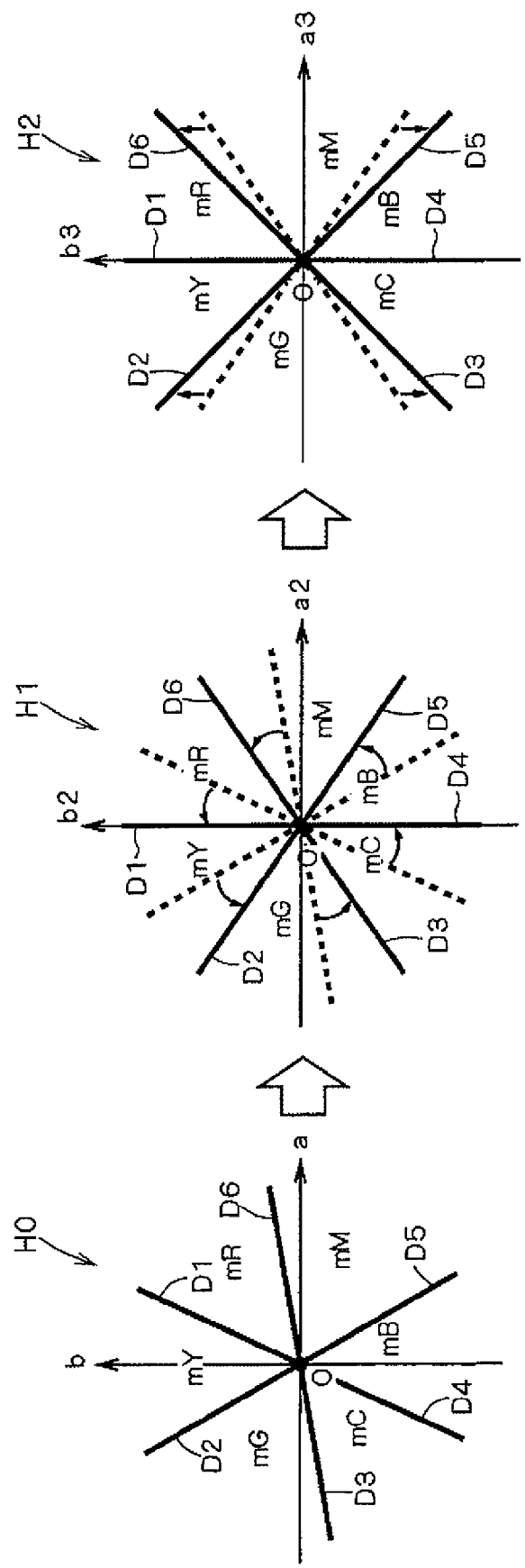
FIG. 3 illustrates a method of acquiring the color plane according to an embodiment of the invention.

FIG. 2 illustrates an example of the color plane H. FIG. 3 illustrates a method of obtaining the color plane H. The color plane H is obtained by performing affine transformation, such as rotation transformation or scaling transformation, on a chromaticity diagram of a typical Lab calorimetric system. Therefore, the color plane H has qualities similar to those of the Lab chromaticity diagram regarding hue and color saturation. That is, each color is radially arranged with the origin O as the center. Furthermore, the hue is indicated by the direction from the origin O, and the color saturation is indicated by the distance from the origin O.

As shown in FIG. 2, the color plane H is configured by an orthogonal coordinate system having a horizontal axis a3 and a vertical axis b3, and each point on the color plane H is expressed by a coordinate position (a3, b3). Therefore, the coordinate position (a3, b3) is used as a parameter relating to the hue and the color saturation (hereinafter referred to as "color parameter"). The position of each unit image data on the color plane H is determined by the chromaticity value (a, b) of each unit image data.

The origin O and the vicinity thereof in the color plane H are known to be substantially achromatic. In the present embodiment, a color saturation boundary line D0 indicating the boundary between a chromatic color and an achromatic color is set in the vicinity of the origin O of the color plane H. The inside of the color saturation boundary line D0 is an achromatic region mA showing an achromatic color. The outside of the color saturation boundary D0 is a chromatic region showing a chromatic color.

Six hue boundary lines D1-D6 indicating the boundaries of the hue are set in the chromatic region on the outside of the color saturation boundary line D0. Each of the hue boundary lines D1-D6 is a half straight line radially extending from the origin side. The chromatic region is divided into a plurality of (six in the present embodiment) color regions mC, mM, mY, mR, mG, and mB by the hue boundary lines D1-D6 and the color saturation boundary line D0.

That is, as shown in FIG. 2, the hue boundary line D1 is the boundary between the color region mR and the color region mY. The hue boundary line D2 is the boundary between the color region mY and the color region mG. The hue boundary line D3 is the boundary between the color region mG and the color region mC. The hue boundary line D4 is the boundary between the color region mC and the color region mB. The hue boundary line D5 is the boundary between the color region mB and the color region mM. The hue boundary line D6 is the boundary between the color region mM and the color region mR.

The color regions mC, mM, mY, mR, mG, mB correspond to six determination colors C (Cyan), M (Magenta), Y (Yellow), R (Red), G (Green), and B (Blue), respectively.

The ground color determination and the color determination according to the present embodiment are executed based on the coordinate position (a3, b3) of each unit image data on the color plane H. For instance, when the coordinate position (a3, b3) of the unit image data is in the achromatic region mA, the color of the unit image data is determined to be achromatic. When the coordinate position (a3, b3) of the unit image data is in one of the color regions mC, mM, mY, mR, mG and mB, the color of the unit image data is determined as any of the chromatic colors C, M, Y, R, G and B having the hue and the color saturation corresponding to the color region.

The color plane H is obtained through the following procedure. First, the hue boundary lines D1-D6 are set on the color plane H0 of Lab calorimetric system (see left side of FIG. 3). The color plane H0 corresponds to a chromaticity diagram of a typical Lab calorimetric system, and has an orthogonal two-dimensional coordinate system with a horizontal axis a and a vertical axis b. The hue boundary lines D1-D6 may be set based on the human sense. Furthermore, the pair of hue boundary lines that are substantially symmetric with respect to the origin O are set to form a straight line, but is not limited thereto. When the pair of hue boundary lines sandwiching the origin O form a straight line as in the present embodiment, the calculating cost of the determination process can be reduced.

Subsequently, the entire hue is rotation-transformed with the origin O as the center so that the hue boundary lines D1 and D4 close to the vertical axis b of the color plane H0 coincide with the vertical axis b. The color plane H1 is thereby obtained (see middle in FIG. 3) The color plane H1 has an orthogonal two-dimensional coordinate system with the horizontal axis a2 and the vertical axis b2.

Next, transformation for enlarging or reducing at different rates for the vertical axis direction and the horizontal axis direction is performed on the entire hue so that the hue boundary lines D2, D3, D5 and D6 are inclined by 45 degrees with respect to the horizontal axis a2 and the vertical axis b2. A color plane H2 is thereby obtained (see right side of FIG. 3). The color plane H2 has an orthogonal two-dimensional coordinate system with the horizontal axis a3 and the vertical axis b3. The color saturation boundary line D0 is set on the color plane H2, whereby the color plane H of FIG. 2 is obtained.

The color determination of the unit image data uses the value of the unit image data as represented in Lab, and is carried out by determining at which position on the color plane H0 corresponding to the chromaticity diagram of Lab colorimetric system the coordinate position (a, b) indicated by the relevant chromaticity exists. In this case, color parameters other than chromaticity do not need to be obtained.

In the color plane H0, the gradient of the hue boundary lines D1-D6 sometimes becomes an irrational number, and thus requires an irrational calculation such as an inverse trigonometric function to determine the color of the unit image data, which worsens the determination efficiency. Thus, in the processes of the unit image data determining section 65, the unit image data counting section 66, the block determining section 67, and the block counting section 68, affine transformation of at least rotation transformation is performed on the image data on the color plane H0, so that the color plane H in which the gradient of the hue boundary lines D1-D6 is a rational number is used.

<2.2 Components of Ground Color Determining Unit and Target Image Determining Unit>

The components of the ground color determining unit 70 and the target image determining unit 80 will now be described. The unit image data determining section 65 (65a, 65b) performs a determination process on the target image converted from RGB color space to Lab color space by the image processor 61. That is, the unit image data determining section 65 determines to which of the color regions mC, mM, mY, mR, mG and mB corresponding to specific chromatic colors, and the achromatic region mA of the color space H the unit image data acquired based on the target image belongs.

The unit image data counting section 66 (66a, 66b) divides the target image into a plurality of blocks. In one example, each block is configured by 900 pieces of unit image data (30 long by 30 wide). The target image data counting section 66 counts the number of unit image data belonging to each of the plurality of color regions mC, mM, mY, mR, mG, mB and the achromatic region mA for each block based on the determination result of the unit image data determining section 65.

For example, the unit image data counting section 66 counts the number of unit image data belonging to the color region mC out of the 900 pieces of unit image data contained in a block, and stores the counted result in the RAM 12. Similarly, the unit image data counting section 66 counts the number of unit image data belonging to each of the color regions mM, mY, mR, mG, mB and the achromatic region MA, and stores the counted results in the RAM 12.

The block determining section 67 (67a, 67b) determines the color contained in each block based on the counted result of the unit image data counting section 66. That is, the block determining section 67 compares for each block the counted value of each of the color regions mC, mM, mY, mR, mG, mB and the achromatic region mA with a reference value for existence confirmation, and determines the color contained in that block.

For example, when the counted value exceeds the reference value for existence confirmation only for the color regions mC and mM with respect to a certain block, it is determined that cyan C and magenta M are contained in that block. When the counted value exceeds the reference value for existence confirmation only for the achromatic region mA with respect to a certain block, it is determined that only the achromatic color exists in that block.

The threshold value (reference value for existence confirmation) used for existence confirmation of the unit image data may be different values in each of the color regions mC, mM, mY, mR, mG, mB and the achromatic region mA, or may be the same value.

The block counting section 68 (68a, 68b) calculates the block counted value for each of the color regions mC, mM, mY, mR, mG, and mB and the achromatic region mA based on the determination result of each block executed by the block determining section 67. That is, the block counting section 68 adds the counted value (block counted value) of the color region and the achromatic region corresponding to the color determined as being contained in each block. For instance, when block determining section 67 determines that only cyan C and magenta M are contained in a certain block, the block counting section 68 adds the counted values of the color regions mC and mM as a counting process relating to that block. When block determining section 67 determines that only the achromatic color is contained in a certain block, the block counting section 68 adds the counted values of the achromatic region mA as a counting process relating to that block. The block counting section 68 stores the result (block counted value) counted for each of the plurality of color regions mC, mM, mY, mR, mG, mB and the achromatic region mA in the RAM 12.

The ground color determining section 71 sets the ground color of the target image based on the counted result of the block counting section 68a when processes by the unit image data determining section 65a, the unit image data counting section 66a, the block determining section 67a, and the block counting section 68a are executed on the target image.

When one or two of the block counted values counted for each of the plurality of color regions mC, mM, mY, mR, mG, mB and the achromatic region mA are greater than or equal to a ground color reference value, the ground color setting section 71 determines that a ground color is present in the color region that is greater than or equal to the ground color reference value, and selects the corresponding color region.

That is, the ground color setting section 71 determines the presence of the ground color based on the block counted value and the ground color reference value of each color region (each color region on a two-dimensional color plane), and determines the color region corresponding to the ground color when it is determined that the ground color is present.

The ground color setting section 71 determines that the ground color is present when a color region in which the block counted value exceeds the ground color reference value is found. Such a color region is determined as the color region corresponding to the ground color. A plurality of ground color reference values are provided, where the ground color is determined to be present not only when one color region exceeds a first ground color reference value, but also when two color regions exceed a second ground color reference value.

The ground color setting section 71 sets a ground color position based on a barycentric position of a plurality of pieces of unit image data contained in the selected color region for the color region selected based on the counted result of the block counting section 68.

The ground color setting section 71 calculates a three-dimensional ground color region P1 based on a three-dimensional distribution of a plurality of pieces of unit image data contained in the selected color region.

For instance, in setting the three-dimensional ground color region P1, the maximum and minimum L value, a3 value, and b3 value are first obtained for a plurality of pieces of unit image data contained in the selected region. The lightness range and the chromaticity range of the ground color are obtained based on the three-dimensional distribution of the unit image data within the color region. The barycentric position based on the unit image data contained in the obtained lightness range and the chromaticity range (i.e., rectangular ground color region P1 (see FIG. 7)) is obtained as the ground color position. Thus, erroneous detection of the ground color is further prevented. The maximum and minimum L value, a3 value, and b3 value obtained in setting the ground color are stored in the RAM 12.

The ground color replacing section 73 replaces the data determined as the ground color (data whose value belongs to the ground color region on the color space) with a predetermined color for the image data (unit image data) to be determined. That is, the ground color replacing section 73 replaces the image data contained in the ground color region P1 set by the ground color setting section 71 with a replacement color. The ground color replacing section 73 switches the necessity of replacement according to the determination signal of a ground color region determining section 98. If there is no replacement, the inputted value is outputted as it is. In the present embodiment, the replacement color is white and the ground color replacing section 73 replaces to white when the color of the image data to be determined is contained in the ground color region P1.

The target image converting section 72 executes affine transformation on the image data (unit image data) in the color plane H based on the ground color set by the ground color setting section 71. Specifically, the target image converting section 72 translates the image data to be determined such that the ground color position P2 (barycentric position) calculated by the ground color setting section 71 is at the origin of the color plane H configured by a plurality of color regions mC, mM, mY, mR, mG, mB and the achromatic region mA.

The mode selecting section 81 selects a processing mode based on the color determination result. For instance, when the block counted value of the color region mC is greater than or equal to a predetermined threshold value, the mode selecting section 81 determines the target image as a color image, and selects the "color mode" for the processing mode. Similarly, when one of the block counted values of the color regions mM, mY, mR, mG, mB is greater than or equal to the predetermined threshold value, the mode selecting section 81 determines the target image as a color image and selects the "color mode" for the processing mode.

When all of the block counted values of the color regions mC, mM, mY, mR, mG, mB are smaller than the predetermined threshold value, the mode selecting section 81 determines the target image as a monochrome image, and selects the "monochrome mode".

The recording unit 51 and the processing units such as the image processor 61 perform a predetermined process on the image data relating to the target image based on the processing mode (color mode, monochrome mode) selected by the mode selecting section 81.

When the monochrome mode is selected by the mode selecting section 81, the recording unit 51 records the target image converted to a monochrome image on recording paper. When the color mode is selected by the mode selecting section 81, the CODEC 31 performs JPEG compression on the target image as color data.

The threshold value used in the color determination may be a value different for each of the color regions mC, mM, mY, mR, mG, mB and the achromatic region mA, or may be the same value.

<3. Functional Configuration of Ground Color Determining Unit>

Figure 4:
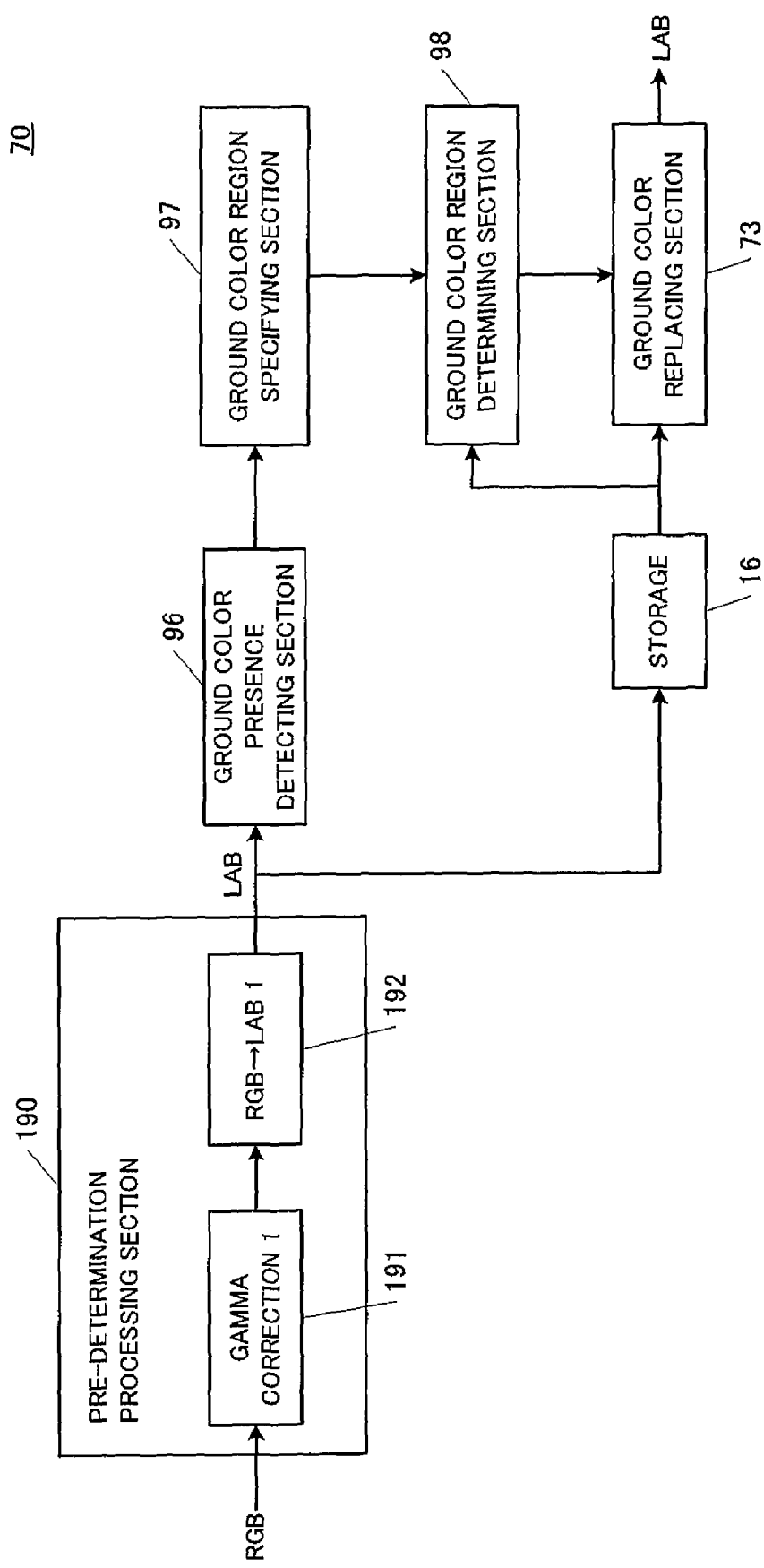
FIG. 4 is a block diagram of a ground color determining section according to an embodiment of the invention.

FIG. 4 is a block diagram relating in particular to the ground color replacing process in the ground color determining unit 70. As shown in FIG. 4, the ground color determining and replacing function by the ground color determining unit 70 is realized by a pre-determination processing section 190, a ground color presence detecting section 96, a ground color region specifying section 97, the ground color region determining section 98, and the ground color replacing section 73.

The pre-determination processing section 190 includes a gamma correction processing part 191 for performing a gamma correction process on the image data related to the target image and a color space converting processing part 192 for converting the color space of the image data related to the target image from RGB to Lab. The image data of Lab color space performed with the pre-determination process is input to the ground color presence detecting section 96 as image data for ground color determination, and stored in the image memory 16 as image data for image output. The function of the pre-determination processing section 190 can be realized by the image processor 61.

The ground color presence detecting section 96 performs determination and counting on the plurality of color regions configuring the color space of the image data performed with the pre-determination process in the pre-determination processing section 190, and detects the presence of the ground color based on the counted result.

That is, when the image data is distributed biased to one or two color regions of the plurality of color regions configuring the two-dimensional plane, that is, when only a specific color region (excluding a color region corresponding to white) exceeds a reference value when the counted value for each color region is compared with the reference value, that region is determined as the color region corresponding to the ground color, and determination is made that the ground color is present. The function of the ground color presence detecting section 96 is realized by the unit image data determining section 65, the unit image data counting section 66, the block determining section 67, and the block counting section 68.

When it is determined that the ground color is present in the image data, the ground color region specifying section 97 specifies the ground color region based on the three-dimensional distribution of the image data belonging to the color region corresponding to the ground color. Furthermore, the ground color region determining section 98 determines whether or not the image data to be determined belongs to the ground color region on the color space using the ground color region P1 specified by the ground color region specifying section 97 and the image data performed with the pre-determination process by the pre-determination processing section 190. The ground color region determining section 98 outputs a determination signal to the ground color replacing section 73 according to the determination result.

<4. Procedure of Ground Color Determination and Color Determination>

Figure 5:
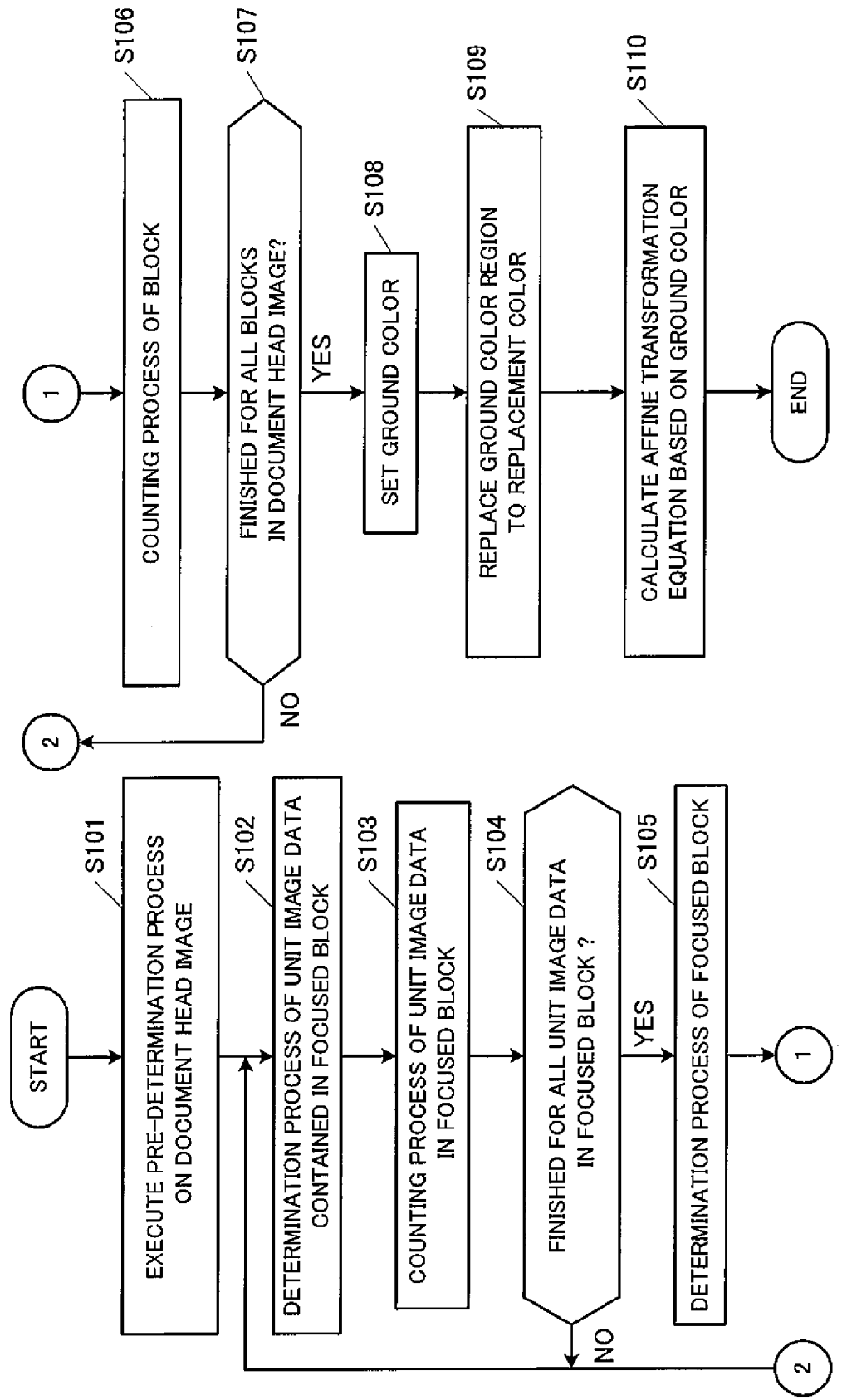
FIG. 5 is a flowchart of a ground color determination procedure according to an embodiment of the invention.
Figure 6:
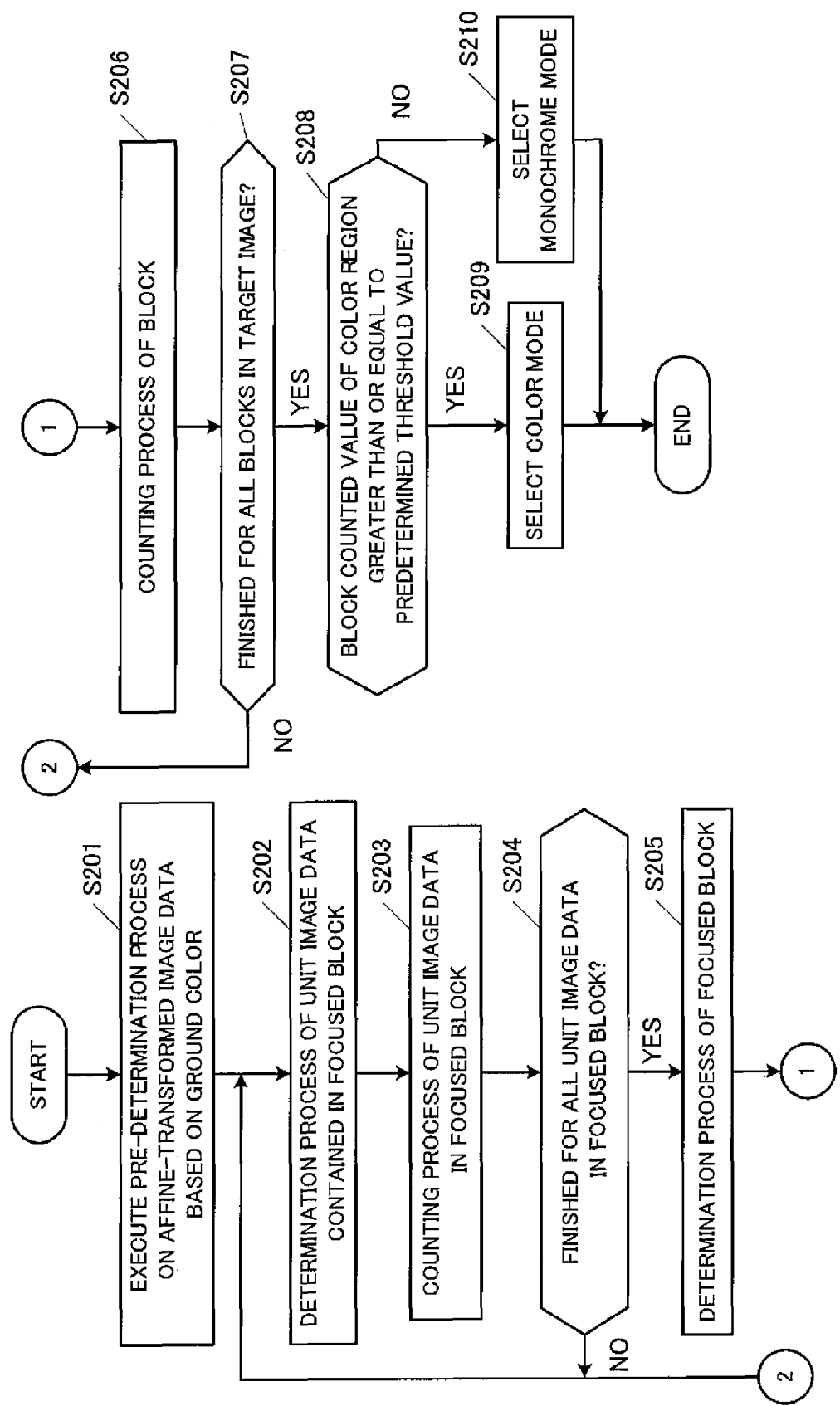
FIG. 6 is a flowchart of a color determination procedure according to an embodiment of the invention.

FIG. 5 is a flowchart of a ground color determination procedure. FIG. 6 is a flowchart of a color determination procedure. The ground color determination procedure will be described first, and thereafter, the color determination procedure will be described.

<4.1 Procedure of Ground Color Determination>

The procedure of ground color determination of the target image will now be described. As shown in FIG. 5, in step S101, the pre-determination process is executed on the image (hereinafter also referred to as "document head image") of a predetermined line (e.g., several tens to several hundreds lines) from the head of the document of the target image prior to the ground color determination.

For instance, the image processor 61 executes a process (averaging process) of generating the unit image data from the target image of RGB color space as the pre-determination process of step S101. The image processor 61 also performs the gamma correction process on the generated unit image data. The image processor 61 further executes the process of converting the color space of the unit image data performed with the gamma correction process from RGB to Lab (lightness L, and chromaticity a, b).

The pixel data not performed with the averaging process may be used as it is for the unit image data. When the average value for every pixel set is used rather than the pixel data as the unit image data, false color due to microscopic mechanical errors of the line sensor and the like in the scanner unit 41, false color due to magnifications of the copy function and the like can be corrected, and thus is preferable in terms of enhancing the precision of the subsequent determinations.

When the unit data is configured by the average values Ravg, Gavg, and Bavg of the color component data for every pixel set, the influence of the false color due to the arrangement of reading lines of R, G, B at a few μm line intervals in the CCD line sensor 41a is eliminated, and determination in the unit image data determining section 65 can be performed with a high degree of accuracy.

False color often becomes a problem when copying at different magnifications. False color can be prevented by delaying the read timing in the subsequent reading line from the preceding reading line if the line interval of the reading line of R, G, B of the CCD line sensor 41a corresponds to an integral multiple of the reading interval in the sub-scanning direction, but the relationship of "integral multiples" is not necessarily established when copying at a different magnification even if the relationship of "integral multiples" is established when copying at the same magnification.

For instance, consider a case where the resolution in the sub-scanning direction when copying at the same magnification is 600 dpi and the line interval corresponds to four times the reading interval. In this case, false color can be prevented by delaying the read timing in the subsequent reading line by four periods from the preceding reading line when copying at the same magnification. The resolution in the sub-scanning direction, however, becomes 420 dpi and the line interval becomes 2.8 times the reading interval when performing 70% reduced copy, and thus the reading position shifts by 0.2 times the reading interval between the preceding reading line and the subsequent reading line even if the read timing in the subsequent reading line is delayed by three periods from the preceding reading line, and such shift becomes a cause of the false color.

In addition, the mechanical shift in the formed position of the reading lines of R, G, and B of the CCD line sensor 41a also becomes a cause of the false color.

The size of the pixel set should be determined according to the line interval and magnification, and the "adjacent four pixels of two pixels long by two pixels wide" is merely illustrative.

In order to eliminate the influence of false color when copying at different magnifications, it is effective to increase the number of pixels in the sub-scanning direction of the pixel set as the "shift in reading position" becomes larger, but since the "shift in reading position" is determined by the magnification, it is desirable to prepare in advance in the ROM 13 a table in which the relationship between the magnification and the number of pixels in the sub-scanning direction of the pixel set is described, and determine the number of pixels in the sub-scanning direction of the pixel set according to the specified magnification with reference to the table.

The averaging section 61c performs averaging on the image data not performed with transformation of resolution by the resolution transforming section 61a, and thus problems will not arise even if the number of pixels in the main scanning direction of the pixel set is constant. The averaging in the main scanning direction is effective for the false color due to the "mechanical shift" described above.

The unit image data determining section 65a then determines to which of the plurality of color regions mC, mM, mY, mR, mG, mB and the achromatic region mA the unit image data contained in a focused block belongs for each of a pre-determined number (e.g., 30×30=900) of blocks divided by the unit image data counting section 66a (S102). The unit image data counting section 66a then counts the number of unit image data belonging to each of the color regions mC, mM, mY, mR, mG, mB and the achromatic region mA based on the determination result of the unit image data determining section 65a (S103). The determination process and the counting process of the unit image data in steps S102 and S103 are executed for all the unit image data in the focused block (S104).

After the determination process and the counting process are completed for all the unit image data within the focused block, the block determining section 67a executes the determination process of the focused block based on the counted result of the unit image data counting section 66a. That is, the block determining section 67a executes the determination process of the color contained in the focused block (S105).

The block counting section 68 then adds the block counted values of the plurality of color regions mC, mM, mY, mR, mG, mB and the achromatic region mA based on the determination result of the block determining section 67a (S106).

The determination process and the counting process of the block in steps S105 and S106 are executed for all the blocks in the document head image (S107).

The determination of the ground color region P1 is preferably performed three-dimensionally in view of lightness (luminance) direction rather than the chromaticity region. According to the three-dimensional determination, the color having the same chromaticity as the ground color but a different lightness from the ground color can be handled separately from the ground color.

In replacement by the ground color replacing section 73, the color having the same chromaticity as the ground color but different lightness from the ground color is not replaced, and only the ground color is accurately replaced.

The ground color setting section 71 then sets the ground color based on the block counted values for each of the plurality of color regions mC, mM, mY, mR, mG, and mB and the achromatic region mA counted by the block counting section 68a. That is, the ground color region P1 (cuboid) on the color space is determined, and the ground color position is determined.

The determination of the ground color position is performed two-dimensionally or three-dimensionally, but an example of performing the determination two-dimensionally using the color plane H will be described in the present embodiment. When the ground color position is determined three-dimensionally, that is, when the lightness direction is also taken into consideration, the load of the arithmetic process increases but the precision of the color determination performed is enhanced by using the ground color position.

The process of S109 is performed on the image data to be determined until a page worth of image data relating to the target image is completed. That is, the replacing process of S109 is executed on the image data excluding the document head image using the ground color region determined based on the image data of the document head image. Using the affine transformation equation calculated in S110, the affine transformation is used in the color determination process using the image data excluding the document head image. That is, after the affine transformation equation is calculated in S110, the color determination (determination of type relating to the color of the image) to be separately described is executed while performing the affine transformation (transformation of moving the ground color position to the origin) on the image data excluding the document head image.

The image data corresponding to the ground color region is replaced (S109) with the replacement color based on the ground color region determined in step S108, the affine transformation equation in the color plane H is calculated (S110), and the determination process of the ground color is terminated.

Therefore, determination and counting for every block can be performed in the ground color determination and color determination of the target image in the present embodiment. Thus, detection of an erroneous ground color due to accumulation of erroneous chromatic or achromatic determination, and execution of color determination of the target image based on an erroneous ground color can be prevented. Furthermore, the counter for counting can be of small scale.

The ground color can be set based on the distribution of the unit image data in the color region selected as the color region corresponding to the ground color in the present embodiment. Thus, the detection of an erroneous ground color can be further prevented.

<4.2 Procedure of Color Determination>

The procedure of color determination of the target image will now be described. As shown in FIG. 6, in step S201, the pre-determination process is performed on the image data affine-transformed based on the affine transformation equation calculated in the ground color determination process prior to the color determination.

For instance, the image processor 51 executes a process of generating the unit image data from the target image of the RGB color space as the pre-determination process of step S201, similar to step S101 of FIG. 5. The image processor 61 also performs the gamma correction process on the generated unit image data. The image processor 61 further executes the process of converting the color space of the unit image data performed wish the gamma correction process from RGB to Lab (lightness L, and chromaticity a, b).

The pixel data of the target image may be used as it is for the unit image data without being subjected to the averaging process. Preferably, however, the average value of the values of pixels contained in the pixel set is used rather than the pixel data itself.

The unit image data determining section 65b then determines to which of the plurality of color regions mC, mM, mY, mR, mG, mB and the achromatic region mA the unit image data contained in a focused block belongs (S202).

The unit image data counting section 66b then counts the number of unit image data belonging to each of the color regions mC, mM, mY, mR, mG, mB and the achromatic region mA based on the determination result of the unit image data determining section 65b (S203).

The determination process and the counting process of the unit image data in steps S202 and S203 are executed until completed for all the unit image data in the focused block (S204).

Figure 7:
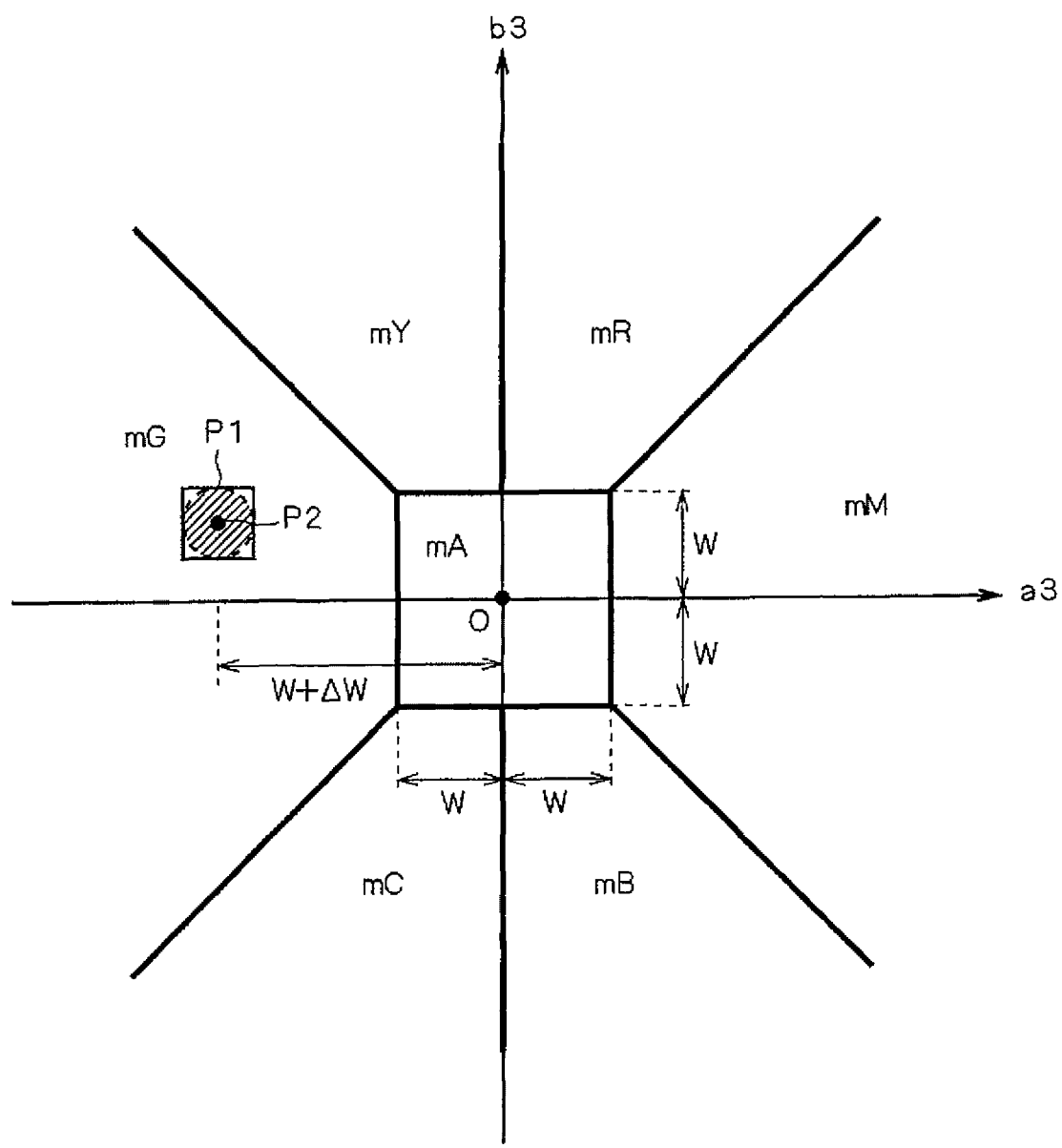
FIG. 7 illustrates a ground color position calculated by a ground color setting section according to an embodiment of the invention.
Figure 8:
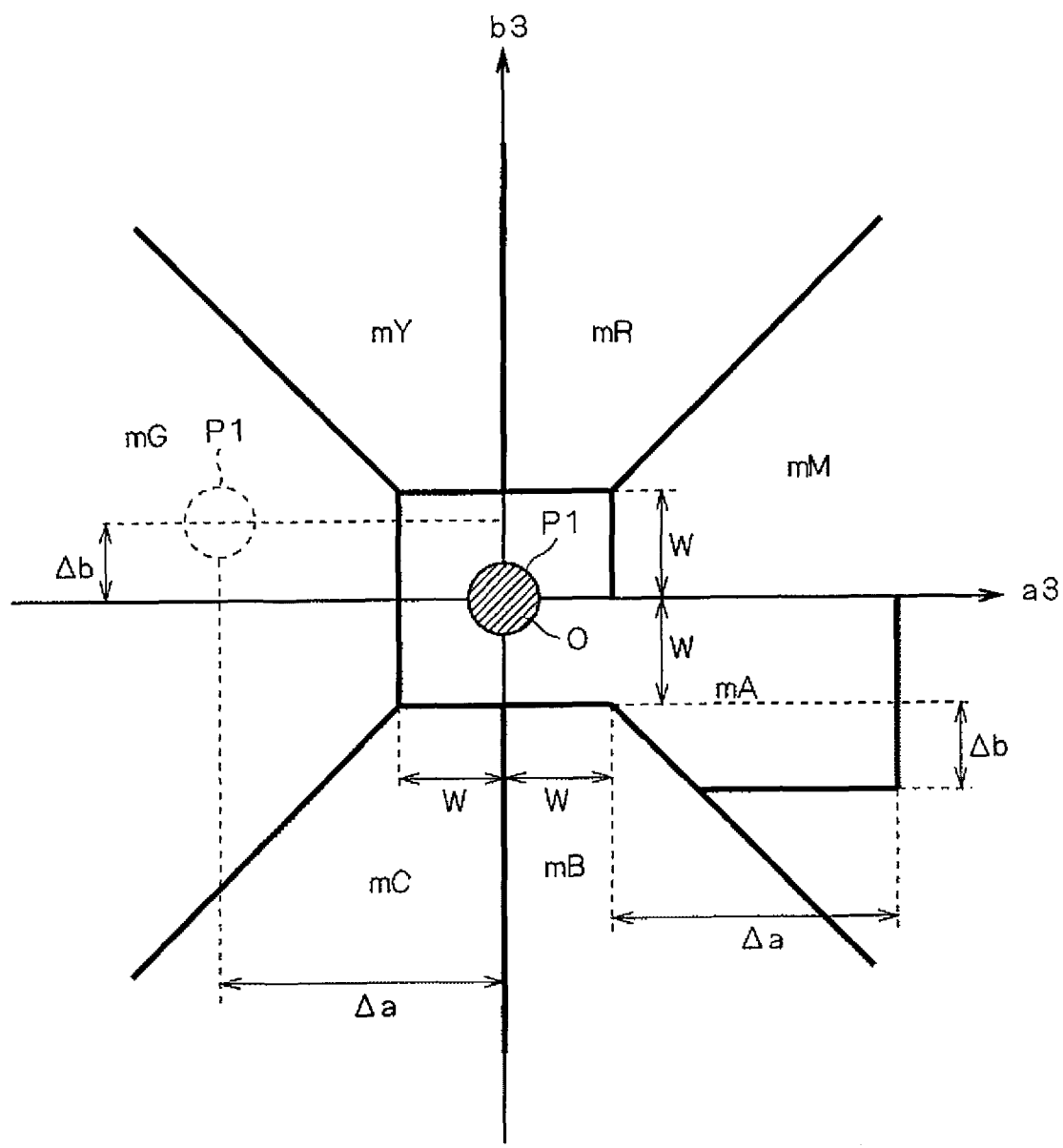
FIG. 8 illustrates an enlarging method of an achromatic region when affine transformation is performed on the target image based on the ground color set by the ground color setting section according to an embodiment of the invention.

FIG. 7 illustrates the ground color position and the ground color region calculated by the ground color setting section 71. FIG. 8 illustrates an enlarging method of the achromatic region when the affine transformation is performed in the color plane H on the image data based on the ground color set by the ground color setting section 71.

When the target image converting section 72 performs the affine transformation (transformation of moving the ground color position to the origin), the achromatic region is enlarged in the direction corresponding to such movement, as shown in FIG. 8. That is, the enlargement process of the achromatic region is performed such that the unit image data (marked image data near the origin before the affine transformation) corresponding to the achromatic color does not go out of the achromatic region. As shown in FIG. 7, the achromatic region mA before the enlargement process is a square and has a shape symmetric with respect to the origin of the plane H, where the length of one side of the achromatic region mA is 2 W. In this case, when the ground color position (barycentric position) on the color region mG where $a3=-\Delta a$ and $b3=\Delta b$ is moved to the origin of the color plane H by the affine transformation, the region mA to be determined as achromatic color must be enlarged by $\Delta a$ in the positive direction of the a3 axis and $\Delta b$ in the negative direction of the b3 axis in the color region mB symmetric to the color region mG with the origin of the color plane H in between (see FIG. 8). That is, the region to be determined as achromatic is enlarged to the color region side symmetric to the color region of the ground color with the origin of the color plane H in between based on the ground color position set by the ground color setting section 71.

Therefore, when the determination process is executed on the image data affine-transformed on the color plane H by the target image converting section 72, the unit image data determining section 65 enlarges the region to be determined as achromatic to the color region symmetric to the color region of the ground color with the origin of the color plane H in between. That is, in the determination process after the affine transformation, the achromatic region mA becomes a region including the ground color region and the achromatic region. The unit image data determining section 65 then executes the determination process of each unit image data with the enlarged achromatic region mA and the plurality of color regions mC, mM, mY, mR, mG, mB. The processing mode thus can be selected with the ground color as achromatic with respect to the target image read from the document having a ground color such as colored paper.

The enlargement process of the achromatic region mA based on the ground color may be executed based on the setting of the user through the display unit 63 or the operation unit 64. For instance, the user sets ON the enlargement process of the achromatic region mA based on the ground color when the used desires to determine the document with a colored ground color (characters etc. are black) as monochrome. The user sets OFF when the user desires to determine the document with a colored ground color (characters etc. are black) as colored. Therefore, the target image determining unit 80 may determine the ground color portion of the document as achromatic based on the setting of the user through the display unit 63 or the operation unit 64.

When the determination process and the counting process are completed for all the unit image data in the focused block, the block determining section 67b then determines the color contained in the focused block based on the counted result of the unit image data counting section 66b (S205).

The block counting section 68 then adds the block counted values of the region determined as being contained in the block for each of the plurality of color regions mC, mM, mY, mR, mG, mB and the achromatic region mA based on the determination result of the block determining section 67b (S206)

The determination process and the counting process of the block in steps S205 and S206 are executed until completed for all the blocks in the target image (S207).

When the processing mode is selected by the mode selecting section 81, the color determination process is completed (S208 to S210). That is, the mode selecting section 81 selects the color mode as the operation mode of the processing unit when one of the block counted value of the plurality of color regions mC, mM, mY, mR, mG, mB becomes greater than or equal to a predetermined threshold value or greater than or equal to a brightness reference value (S209) The mode selecting section 81 selects the monochrome mode as the operation mode (S210) when all of the block counted values are smaller than the predetermined threshold value or the brightness reference value (S208).

<5. Variation>

(1) In the present embodiment, the image data corresponding to the ground color region P1 (see FIG. 7) is described as being replaced with white by the ground color replacing section 73, but the replacement color is not limited to white. The replacement color may be an achromatic color other than white, or may be a chromatic color. That is, the replacement color may be any color specified by the user.

(2) Furthermore, the replacement color is described as being defined as white in advance in the present embodiment, but the present invention is not limited thereto. The replacement color may be set based on the image read from a predetermined region on the document 90. That is, the user may specify a predetermined position on the document, and set the color present in the specified position as the replacement color.

For instance, a replacement color setting section may be arranged in the image color determining device in addition to the ground color setting section 71 and the ground color replacing section 73. The replacement color setting section sets the replacement color based on the predetermined region defined in advance in the document or the color of the predetermined region specified by the user. The ground color replacing section 73 then replaces the ground color with the replacement color defined for every document.

Therefore, the replacement color may be specified by the user through operation of the display unit 63 or the operation unit 64, or may be specified using the document.

(3) The ground color determining unit 70 and the target image determining unit 80 have been described as including the unit image data determining section 65 (65a, 65b), the unit image data counting section 66 (66a, 66b), the block determining section 67 (67a, 67b), and the block counting section 68 (68a, 68b) respectively in the present embodiment, but the configuration of the image color determining device 1 is not limited thereto.

Figure 9:
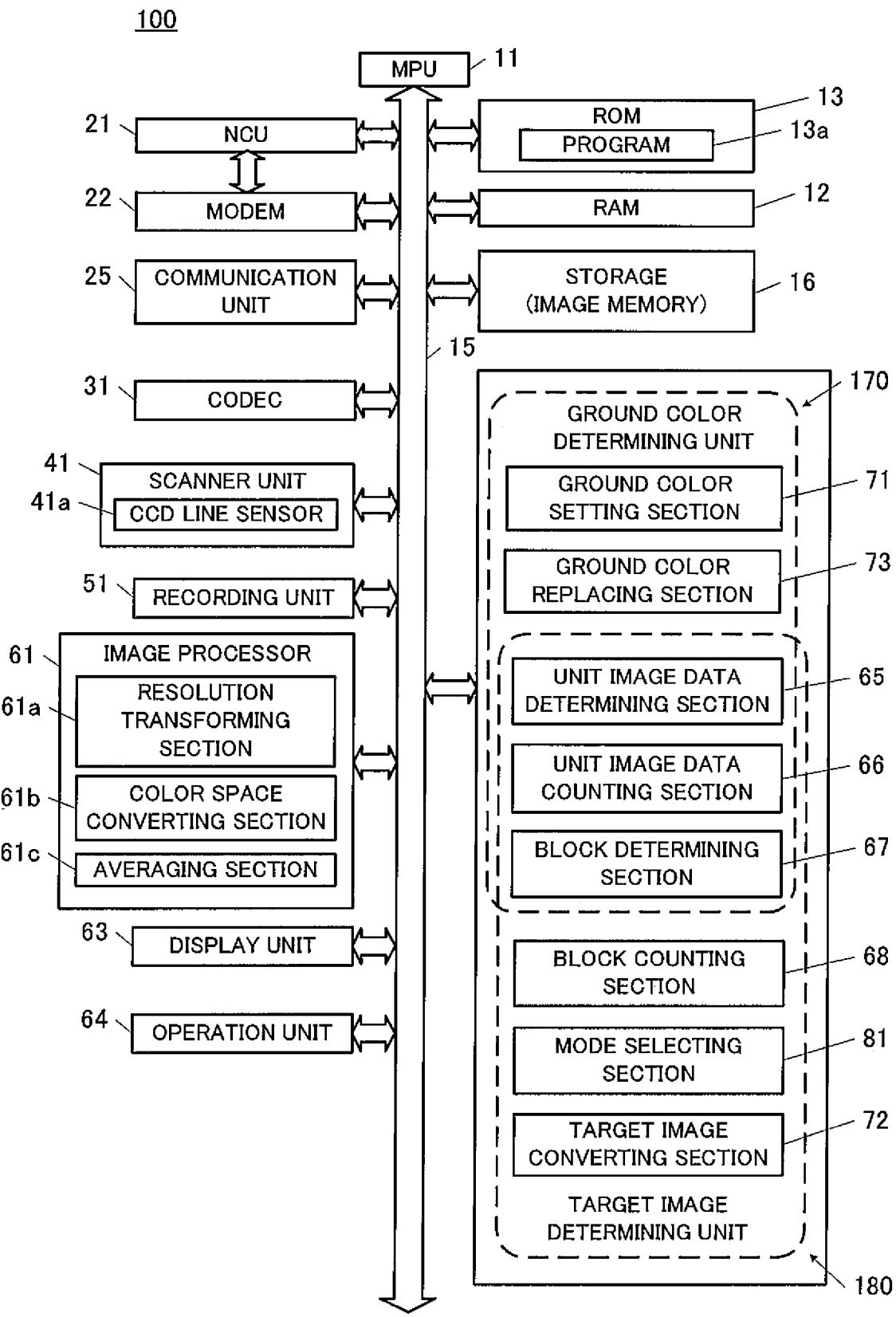
FIG. 9 is a block diagram of an image color determining device according to another embodiment of the present invention.

For example, as shown in FIG. 9, the ground color determining unit 70 and the target image determining unit 80 may have the functions thereof realized by the common unit image data determining section 65, unit image data counting section 66, block determining section 67, and block counting section 68.

Figure 10:
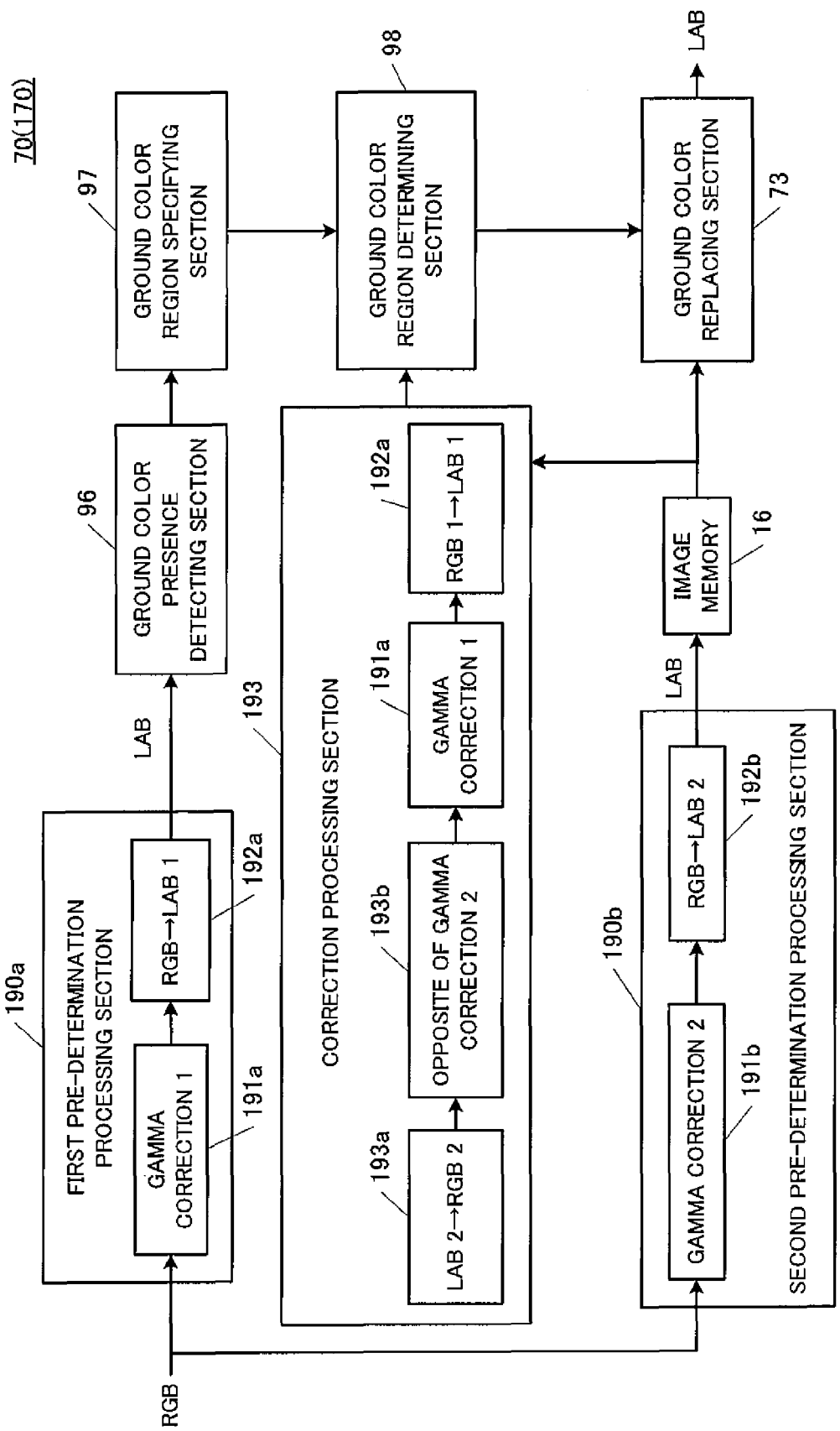
FIG. 10 is a block diagram of a ground color determining section according to another embodiment of the invention.

(4) Moreover, the ground color determination relating to ground color replacement is described as being executed based on the image data performed with the pre-determination process by the pre-determination processing section 190 common for image output, as shown in FIG. 4, but the pre-determination process on the image data is not limited thereto. FIG. 10 is a block diagram showing another example of a functional configuration relating to the ground color replacement of the ground color determining unit 70 (170). In the ground color determining unit 70, (a) gamma correction process suited for the image output (printing etc.) may be performed on the image data stored in the image memory 16, and (b) gamma correction process (gamma correction process suited for the ground color determination) aiming to raise the sensitivity with respect to color saturation may be performed on the image data inputted to the ground color presence detecting section 96, respectively.

In the ground color determination shown in FIG. 10, a first pre-determination processing section 190a on the ground color presence detecting section 96 side performs, on the image data, a first gamma correction process by a first gamma correction processing part 191a and a first color space converting process (process to convert from RGB to Lab color space) by a first color space converting processing part 192a. As a result, first target image data is acquired as processed image data, and the first target image data acquired as the processed image data is inputted to the ground color presence detecting section 96.

A second pre-determination processing section 190b on the image memory 16 side performs, on the image data, a second gamma correction process by a second gamma correction processing part 191b and a second color space converting process (process to convert from RGB to Lab color space) by a second color space converting processing part 192b. As a result, second target image data is acquired as the processed image data, and the second target image data is stored in the image memory 16. As described above, the first gamma correction process is a process having the content suited for the ground color determination, and the second gamma correction process is a process having the content suited for the image output.

A first correction processing section 193 is capable of correcting the image data for the image output. As shown in FIG. 10, the first correction processing section 193 includes a third color space converting processing part 193a for performing a color space converting process opposite from the second color space converting processing part 192b, a third gamma correction processing part 193b for performing a gamma correction process opposite from the second gamma correction processing part 191b, the first gamma correction processing part 191a, and the first color space converting processing part 192a.

The ground color region determining section 98 executes the ground color region determination by the ground color region P1 specified using the image data performed with the first pre-determination process, and the data performed with correction on the second target image by the first correction processing section 193. In this case, the positional shift on the color space that occurs from the difference between the first pre-determination process and the second pre-determination process can be absorbed by the correction process of the first correction processing section 193, and the ground color determination can be executed based on the rectangular (cuboid or rectangle) ground color region P1, and thus the determination process can be easily executed.

Since the first gamma correction process and the second gamma correction process are different, and the first pre-determination process and the second pre-determination process are different, the first color space converting space and the second color space converting process are distinctly described, but the contents of the first color space converting process and the second color space converting space are the same.

Figure 11:
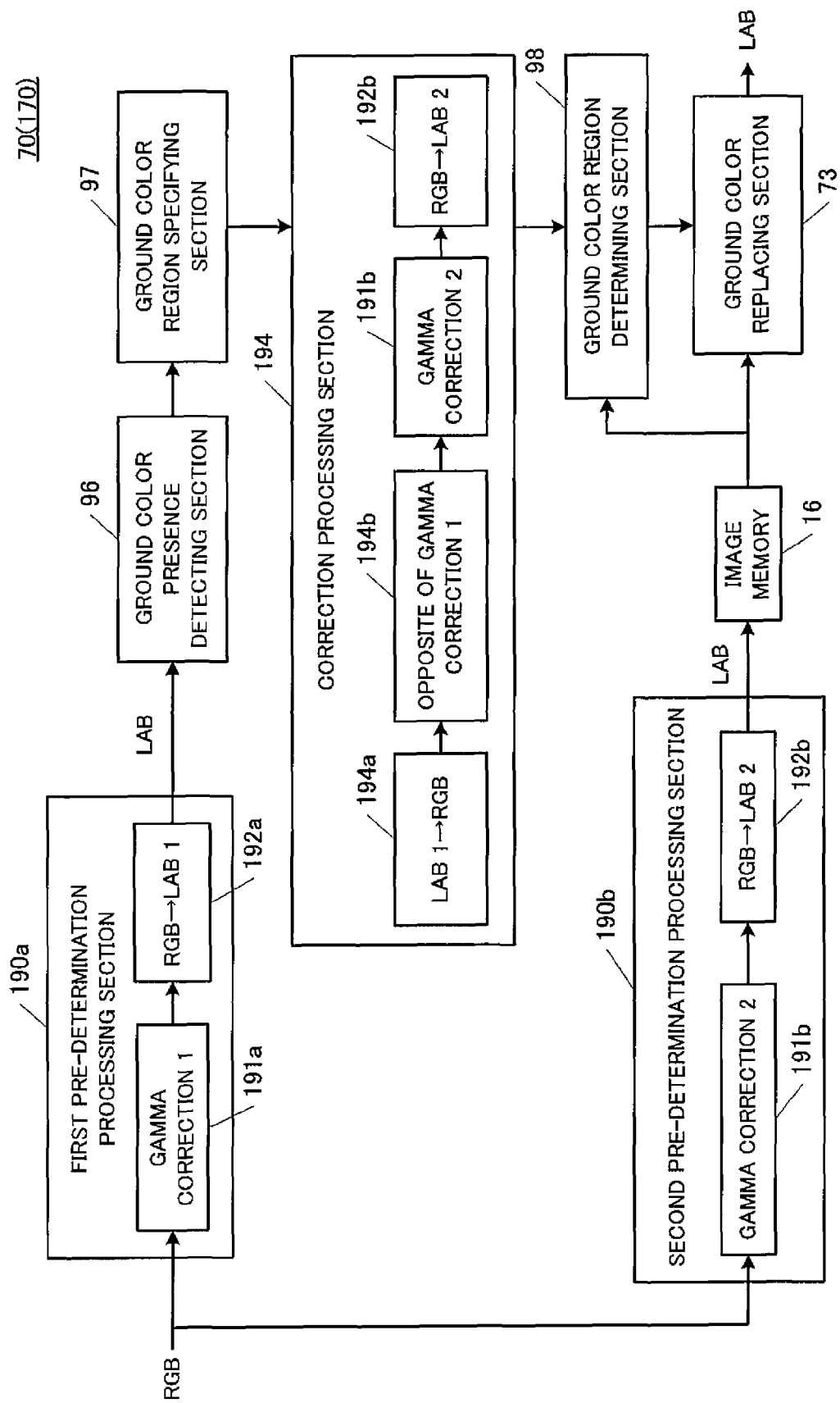
FIG. 11 is a block diagram of a ground color determining section according to another embodiment of the invention.

(5) Similar to FIG. 10, FIG. 11 is a block diagram showing another example of a functional configuration relating to the ground color replacement of the ground color determining unit 70 (170). The same reference numerals denote similar components as in FIG. 10. The components of the same reference numerals have been described in relation to FIG. 10, and thus the description thereof will be omitted.

A second correction processing section 194 is capable of correcting the ground color region specified by the ground color region specifying section 97. As shown in FIG. 11, the second correction processing section 194 includes a fourth color space converting processing part 194a for performing a color space converting process opposite from the first color space converting processing part 192a, a fourth gamma correction processing part 194b for performing a gamma correction process opposite from the first gamma correction processing part 191a, the second gamma correction processing part 191b, and the second color space converting processing part 192b.

The ground color region determining section 98 can execute the ground color region determination by the ground color region P1 specified using the first target image data (image data performed with the pre-determination process for the image output) and corrected by the second correction processing section 194, and the second target image data (image performed with the pre-determination process for the image output).

(6) The ground color determining unit 70 and the target image determining unit 80 are described as being realized in terms of circuits (hardware) in the present embodiment, but are not limited thereto. For example, the functions of the ground color determining unit 70 and the target image determining unit 80 may be realized by the MPU 11 based on the program 13a stored in the ROM 13.

(7) Furthermore, the ground color determining unit 70 performs the ground color determination based on the document head image in the present embodiment, but is not limited thereto. The ground color determination may be performed using the image data of the rear edge of the target image or one part of the front end of the right edge.

Since the ground color determination is performed based on the document head image in the present embodiment, a storage means for simultaneously storing the image data relating to the document image for one page is not arranged, and thus is applicable to an image color determining device that sequentially performs the process from the document head image to the document rear edge image. That is, even if the capacity of the storage means is less than or equal to that for one page, the result of the ground color determination performed based on the document head image can be reflected on the color determination process of the subsequent document image data. If the storage means for simultaneously storing the image data relating to the document image for one page is arranged, the ground color determination may be performed based on the document rear edge image or the document right edge image and not limited to the document head image.

(8) Furthermore, the unit image data determining section 65 is described as executing the ground color determination and the color determination on the target image represented in Lab in the present embodiment, but is not limited thereto. A calorimetric system other than Lab may be used as long as it is the calorimetric system including parameters (luminance, lightness) relating to brightness and parameters (color difference, chromaticity) relating to hue and color saturation such as YCrCb, YIQ, and Luv.

While the present invention has been described with respect to embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image color determining device comprising:
a ground color presence detecting section for determining a presence of a ground color of a target image based on image data relating to the target image;
a ground color region specifying section for specifying a ground color region in a color space when it is determined that the ground color is present by the ground color presence detecting section;
a ground color determining section for determining whether or not the image data to be determined is a ground color region based on the ground color region specified by the ground color region specifying section; and
a ground color replacing section for replacing the image data determined as the ground color region by the ground color region determining section with a predetermined color, wherein
the ground color presence detecting section counts the number of constituting units of the image data for every color region on a two-dimensional color plane divided into a plurality of color regions, and determines the presence of the ground color using the counted result, and
the ground color region specifying section specifies the ground color region based on three-dimensional distribution of the constituting units in the color region corresponding to the around color in the color space when the ground color presence detecting section determines that the ground color is present.

2. The image color determining device according to claim 1, further comprising:
a first pre-determination processing section for performing a first pre-determination process for ground color determination on the image data relating to the target image;

a second pre-determination processing section for performing a pre-process for image output on the image data relating to the target image, the pre-process being a second pre-determination process different from the first pre-determination process; and a correction processing section for performing a correction process corresponding to inverse transformation of the second pre-determination process and a correction process corresponding to the first pre-determination process on the image data performed with the second pre-determination process; wherein the image data performed with the first pre-determination process is a processing target of the ground color presence detecting section and the ground color region specifying section; and the ground color region determining section determines whether the ground color region or not based on the ground color region specified by the ground color region specifying section and the image data performed with the correction process by the correction processing section.

3. The image color determining device according to claim 1, further comprising:

a first pre-determination processing section for performing a first pre-determination process for ground color determination on the image data relating to the target image;

a second pre-determination processing section for performing a pre-process for image output on the image data relating to the target image, the pre-process being a second pre-determination process different from the first pre-determination process; and a correction processing section for performing a correction process corresponding to inverse transformation of the first pre-determination process and a correction process corresponding to the second pre-determination process on the ground color region specified by the ground color region specifying section; wherein the ground color region determining section determines whether the ground color region or not based on the ground color region corrected by the correction processing section and the image data performed with the second pre-determination process.

4. The image color determining device according to claim 1, wherein the ground color region specifying section calculates a maximum value and a minimum value of a plurality of constituting units counted for the color region corresponding to the ground color in the color space, and determines the ground color region based on the maximum value and the minimum value.

5. The image color determining device according to claim 1, wherein the ground color presence detecting section averages pixel data for every pixel set containing a plurality of pixels, and performs color determination of the pixel data with the averaged pixel data as the constituting unit.

6. The image color determining device according to claim 1, wherein the predetermined color is specified by a user.

7. The image color determining device according to claim 1, wherein the predetermined color is set as a color present in a specified region of a document.

8. The image color determining device according to claim 1, wherein the predetermined color is white.

9. A multi-function peripheral comprising the image color determining device according to claim 1, and having scanning, printing, copying and facsimile functions.

10. A method for determining an image color, comprising the steps of:

a ground color presence detecting step of determining a presence of a ground color of a target image based on image data relating to the target image;

a ground color region specifying step of specifying a ground color region in a color space when it is determined that the ground color is present in the ground color presence detecting step;

a ground color determining step of determining whether or not the image data to be determined is a ground color region based on the ground color region specified in the ground color region specifying step; and a ground color replacing step of replacing the image data determined as the ground color region in the ground color region determining step with a predetermined color, wherein the ground color presence detecting step includes counting of the number of constituting units of the image data for every color region on a two-dimensional color plane divided into a plurality of color regions, and determination on the presence of ground color using the counted result, and the ground color region specifying step includes specification of the ground color region based on three-dimensional distribution of the constituting units in the color region corresponding to the ground color in the color space when it is determined that the ground color is present in the ground color presence detecting step.

11. The method for determining the image color according to claim 10, further comprising the steps of:

a first predetermination processing step of performing a first pre-determination process for ground color determination on the image data relating to the target image;

a second pre-determination processing step of performing a pre-process for image output on the image data relating to the target image, the pre-process being a second pre-determination process different from the first pre-determination process; and a correction processing step of performing a correction process corresponding to inverse transformation of the second pre-determination process and a correction process corresponding to the first pre-determination process on the image performed with the second pre-determination process; wherein the image performed with the first pre-determination process is a processing target in the ground color presence detecting step and the ground color region specifying step; and the ground color region determining step includes determination as to whether the ground color region or not based on the ground color region specified in the ground color region specifying step and the image data performed with the correction process in the correction processing step.

12. The method for determining the image color according to claim 10, further comprising the steps of:

a first pre-determination processing step of performing a first pre-determination process for ground color determination on the image data relating to the target image;

a second pre-determination processing step of performing a pre-process for image output on the image data relating to the target image, the pre-process being a second pre-determination process different from the first predetermination process; and a correction processing step of performing a correction process corresponding to inverse transformation of the first pre-determination process and a correction process corresponding to the second pre-determination process on the ground color region specified in the ground color legion specifying step; wherein the ground color region determining step includes determination as to whether the ground color region or not based on the ground color region corrected in the correction processing step and the image data performed with the second pre-determination process.

13. The method for determining the image color according to claim 10, wherein the ground color region specifying step includes calculation of a maximum value and a minimum value of a plurality of constituting units counted for the color region corresponding to the ground color in the color space, and determination of the ground color region based on the maximum value and the minimum value.

14. The method for determining the image color according to claim 10, wherein the ground color presence detecting step includes averaging of the pixel data for every pixel set containing a plurality of pixels, and color determination of the pixel data with the averaged pixel data as the constituting unit.

15. The method for determining the image color according to claim 10, wherein the predetermined color is specified by a user.

16. The method for determining the image color according to claim 10, wherein the predetermined color is set as a color present in a specified region of a document.

17. The method for determining the image color according to claim 10, wherein the predetermined color is white.

* * * * *